(12) United States Patent
Bozorgi

(10) Patent No.: US 6,252,743 B1
(45) Date of Patent: Jun. 26, 2001

(54) READ/WRITE POSITIONING ARM WITH INTERSPACED AMPLIFIER CHIPS

(75) Inventor: Jamshid Bozorgi, Fremont, CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/184,519

(22) Filed: Nov. 2, 1998

(51) Int. Cl.$^7$ ............................................. G11B 17/02
(52) U.S. Cl. ............................. 360/244.1; 360/264.2
(58) Field of Search .......................... 360/244.1, 245.8, 360/245.9, 264.2; 361/685, 684, 686, 809, 749

(56) References Cited

U.S. PATENT DOCUMENTS

| | | | |
|---|---|---|---|
| 5,014,145 | 5/1991 | Hosokawa et al. | 360/104 |
| 5,055,969 | 10/1991 | Putnam | 361/398 |
| 5,166,846 | 11/1992 | Shigemoto | 360/104 |
| 5,245,489 | 9/1993 | Kimura et al. | 360/104 |
| 5,305,167 | 4/1994 | Nagase et al. | 360/104 |
| 5,305,168 | 4/1994 | Lin et al. | 360/104 |
| 5,311,400 | 5/1994 | Fuchs et al. | 361/736 |
| 5,323,284 | 6/1994 | Pecha et al. | 360/104 |
| 5,343,344 | 8/1994 | Nagase | 360/104 |
| 5,414,576 | 5/1995 | Ueki et al. | 360/104 |
| 5,452,141 | 9/1995 | Money et al. | 360/104 |
| 5,528,819 | 6/1996 | McKay et al. | 29/603.07 |
| 5,539,596 | 7/1996 | Fontana et al. | 360/106 |
| 5,555,619 | 9/1996 | Maggio et al. | 29/860 |
| 5,557,489 | 9/1996 | Nakashima et al. | 360/104 |
| 5,631,788 | 5/1997 | Richards | 360/104 |
| 5,655,286 | 8/1997 | Jones, Jr. | 29/603.13 |
| 5,666,717 | 9/1997 | Matsumoto et al. | 29/603.12 |
| 5,673,484 | 10/1997 | Masaichi et al. | 29/896.93 |
| 5,699,212 | 12/1997 | Erpelding et al. | 360/104 |
| 5,712,747 | 1/1998 | Voldman et al. | 360/103 |
| 6,025,988 | * 2/2000 | Yan | 361/685 |
| 6,134,084 | * 10/2000 | Ohwe et al. | 360/244.1 |

* cited by examiner

Primary Examiner—Robert S. Tupper
(74) Attorney, Agent, or Firm—Mark Lauer

(57) ABSTRACT

Amplifier chips for heads in a disk drive are interspaced adjacent to junctions between actuator arms and suspension arms that hold the heads. This allows decreased spacing between plural disks in the drive system and accelerated data rates. This also decreases assembly steps and damage to the chips as they are further removed from mechanical processes such as swaging that attach the suspension arms to the actuator arms. Damage to the disks or chips during operation is also averted, as the chips are removed from each other and from the rapidly spinning disk surfaces with which the suspension arms and heads are proximate. The interspacing can also improve performance characteristics of the preamplifier chips, which do not need to be made as thin in order to fit between disks, decreasing costs and problems such as overheating of the chips.

11 Claims, 3 Drawing Sheets

READ/WRITE POSITIONING ARM WITH INTERSPACED AMPLIFIER CHIPS

TECHNICAL FIELD

The present invention relates to arms or suspensions for positioning heads in information storage and retrieval systems, and electronics accompanying those arms for signal transmission.

BACKGROUND OF THE INVENTION

Information storage devices typically include semiconductor memories such as RAM or electromechanical memories such as hard disk drive systems. Electromechanical memories are sometimes termed mass storage devices, as they are typically more cost effective than semiconductor memories, but may suffer from slower access times and data rates.

Conventional hard disk drive systems employ at least one rotating disk having magnetic media layers adjacent to both its major surfaces. Transducers or heads are typically held adjacent to each major surface for writing and/or reading information on the media layers. An arm holding the transducers is moved by an actuator to position the transducers adjacent to various tracks of the rapidly spinning disk. A "linear actuator" typically moves an arm toward and away from a center of the disk along a radius of the disk with which the arm is aligned, whereas a "rotary actuator" rotates an arm about a pivot at a side of the disk to sweep the suspension and transducer across the disk surface.

For increased storage capacity, several disks are commonly provided in a single information storage system, each disk having an associated pair of heads for transducing information via each major surface of the disk. The suspension arms for each pair of these heads are commonly mounted to an actuator arm, with the actuator arms extending from an "E-block" and the connected heads, suspension arms and E-block forming a "head-stack assembly." A rotary actuator moves the E-shaped block to cause all the suspension arms and heads to sweep across the disks in tandem. In addition to increasing overall storage capacity, multi-disk drives can decrease access time. More significant increases in data rates are afforded by improvements in transducer and drive electronics.

Conventional disk drives have signal amplifiers that are located on the E-block so that the mass and size of the amplifier chips do not interfere with the positioning of the heads on the disks. Signals between the heads and amplifiers have typically been carried by twisted wires which are held in tubing that runs along the sides of the suspension arm. Head-amplifier signals are modernly carried by electrical traces deposited on the suspension arms, or flexible circuit boards attached to the suspension arms, with additional flexible cables extending along the actuator arms to reach the amplifier. Inductance in the conductors between the heads and amplifiers is a bottleneck in high data rate applications, but can be reduced by shortening the length of the conductors, implying moving the amplifiers closer to the heads.

Some inventions have proposed placing an amplifier atop the suspension arm along with the conductors. Unfortunately, this can adversely affect the dynamic performance of the suspension arm, and it may be difficult to make the amplifier thin enough to avoid contact with the disk during operation. Other inventions propose inserting a signal booster element such as a transformer into the conductors that run along the flexures, held by the tubing. Proposals also exist to locate a preamplifier chip on each suspension arm, connected to conductive traces that run on the disk-facing side of each suspension arm. A difficulty with this approach is that the preamplifier chips are each exposed adjacent to a disk and during actuation sweep across the disk surface, which becomes more problematic in the event of a shock to the drive. This limits the size of the chips or, conversely, the size of the chips limits the spacing between disks. Many of these approaches are also constrained by manufacturing difficulties.

SUMMARY OF THE INVENTION

The present invention solves these problems by locating preamplifier chips adjacent to suspension arms that hold the heads, while fitting the chips into relatively inconspicuous and innocuous areas, interspaced adjacent to each actuator arm so that the chips are not affected by the thickness of the arm. Advantages of the present invention include the potential for decreased spacing between plural disks in a drive system and accelerated data rates. The interspacing can reduce damage to the preamplifier chips as they are further removed from mechanical processes such as swaging that attach the suspension arms to the actuator arms. Damage to the disks or preamplifier chips during operation is also averted according to the present invention, as the chips are removed from the rapidly spinning disk surfaces with which the suspension arms and heads are proximate, and removed from each other to avoid damage during a shock event. The interspacing can also improve performance characteristics of the preamplifier chips, which do not need to be made as thin in order to fit between disks, decreasing costs and problems such as overheating of the chips. Moreover, such larger chips can provide amplification for a pair of heads instead of a single head. The chips may be attached to a mounting end of the suspension arms, eliminating extra support pieces or manufacturing operations.

In a first embodiment a pair of preamplifier chips are located adjacent to a pair of baseplates that mount a pair of suspension arms to an actuator arm, the chips being disposed on the same side of the arm but at different distances from their respective heads. A second embodiment includes a preamplifier chip disposed adjacent opposite sides of the arms. In this case the conductors and chip can be attached to the same side of each suspension arm, which results in the chips for "up" and "down" suspension arms being located adjacent opposite sides after attachment of the suspension arms to the actuator arms. A third embodiment utilizes a single chip for both heads, with the chip disposed at the side of the arm adjacent both baseplates and removed from the disk-facing surfaces of the baseplates. The chip or chips may instead be mounted to an actuator arm that also holds the suspension arms, either on the side of the actuator arm or on an end between the suspension arms.

DETAILED DESCRIPTION OF THE PREFERRED EMBODIMENTS

Figure 1:
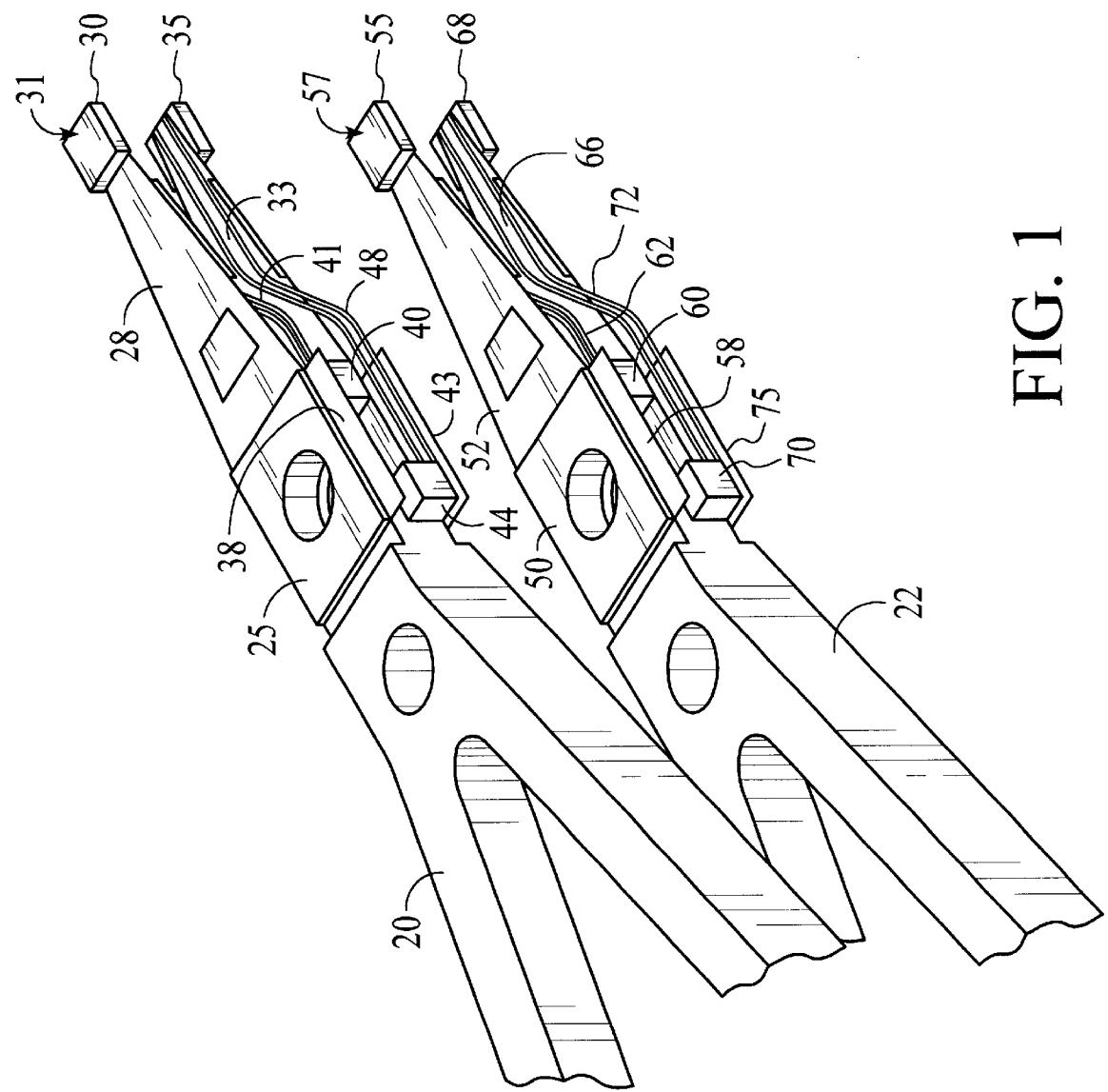
FIG. 1 is a cutaway perspective view of a first embodiment of the present invention, with a pair of actuator arms from a head-stack assembly each having a pair of head suspension arms connected, and a pair of preamplifier chips disposed on one side of each arm, the chips disposed at variable distances from their respective heads.

FIG. 1 shows a first embodiment of the present invention, in which a pair of actuator arms 20 and 22 forming part of an E-block extend from a pivot of rotary actuator which is not shown, with each of the actuator arms connected to a pair of load beams or suspension arms that each hold a head or slider. Thus actuator arm 20 is coupled at a base plate 25 to a mounting end of a first suspension arm 28, which holds at its free end a first head or slider 30 having a disk-facing surface 31. Actuator arm 20 is coupled to a mounting end of a second suspension arm 33 by a second base plate which is hidden in this perspective view, the second suspension arm 33 holding at its free end a second head or slider 35 having a disk-facing surface which is turned away from the viewer of this figure. A tab or flange 38 extends from the mounting end of the first suspension arm 28, with a first preamplifier chip 40 attached to the flange and electrically connected by a flex cable or conductive traces 41 to the slider 30. A second flange 43 provides support for a second preamplifier chip 44, which is electrically connected by a second set of conductive traces 48 that run along a non-disk-facing side of the second suspension arm 33. As shown below, the conductors can alternatively be attached to either or both a disk-facing side and a non-disk-facing side of the suspension arms.

Similarly, a third base plate 50 attaches a third suspension arm 52 to a third slider 55 which has a disk-facing surface 57. A third flange 58 supports a third preamplifier chip 60 which is electrically connected to slider 55 via flex cable traces 62. A fourth suspension arm 66 is likewise attached to actuator arm 22 and holds a fourth head 68 which is electrically connected to a fourth preamplifier chip 70 by a fourth set of flex cable traces 72. A fourth flange 75 extends from the mounting end of the fourth suspension arm 66 to support and protect the fourth chip 70. The flanges 38, 43, 58 and 75 may be made from the same sheet as the remainder of their respective suspension arms 28, 33, 52 and 66, and do not need additional bending or forming steps to provide a supports for chips 40, 44, 60 and 70. In a state free of interaction with the disks, the suspension arms have a slight bend (typically less than fifteen degrees) near the baseplates in order to bias the heads toward the disks, however this bend still leaves the flanges in substantially the same plane as their respective suspension arms. Similarly, side rails rise from the sides of the suspension arms, leaving the suspension arms as substantially flat and flexibly resilient beams.

Figure 2:
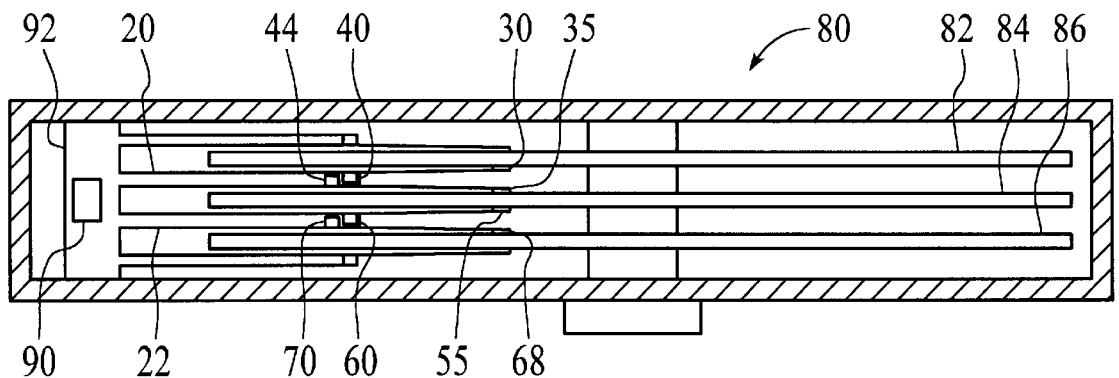
FIG. 2 is a side view of a disk drive system including the heads, suspension arms, actuator arms and chips of FIG. 1.

As shown additionally in FIG. 2, preamplifier chips 40 and 44 are attached at significantly different distances from the first and second sliders 30 and 35, allowing those chips to occupy most of the thickness of arm 20. Stated differently, compared with having the chips equidistant from their respective sliders, the staggered positioning of the chips allows the actuator arm to be thinner, allowing disks to be positioned closer to each other. An information storage system 80 depicted in FIG. 2 includes three disks 82, 84 and 86, with actuator arms 20 and 22 interspersed between the disks. Preamplifier chips 60 and 70 are also disposed at appreciably different distances from respective third and fourth sliders 55 and 68, affording the use of full-size preamplifier chips on arm 22. Each of the preamplifier chips in this system is electrically connected to a mother amplifier 90 attached to E-block 92, the amplifier 90 in turn connected to a disk drive controller disposed outside system 80 and not shown in this figure. Although preamplifiers 40, 44, 60 and 70 are shown disposed on the same side of E-block 90 as mother amplifier 90 for clarity, the mother amplifier 90 can be located in alternative positions such as the on a back end of the E-block or actuator and interconnected to the preamps with flex cables.

The attachment of preamplifier chips on flanges extending from mounting ends of suspension arms offers a number of advantages over conventional and proposed arrangements. As mentioned above, the actuator arms can be thinner, providing for much thinner head-stack assemblies, yet the chips can be a relatively large size. Such large chips are more cost effective, lowering the price of the drive. Larger chips typically also generate less heat, which can be beneficial to the drive as well as chip performance. Additional forming of the suspension or other metal is not needed, yet the chips are removed from potential damage during swaging. This can lead to a large increase in the percentage of head-stack assemblies that are functional, or "yield" during manufacture, which can swing a project from loss to profit. Operational dynamics are also improved, as pairs of preamp chips are separated and the chance of their collision during a shock to the drive is substantially reduced. The flex circuits 41, 48, 62 and 72 are maintained essentially in a plane adjacent to their respective suspension arms, further simplifying mechanics.

Figure 3:
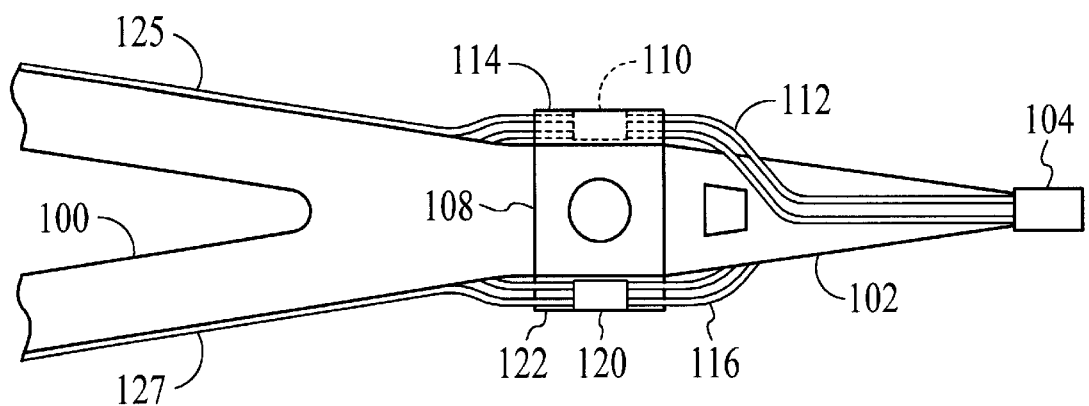
FIG. 3 is a top view of a second embodiment of the present invention in which a preamplifier chip attached to a top suspension arm is disposed on an opposite sides of an actuator arm than a preamplifier chip attached to a bottom suspension arm.

An alternative embodiment of the present invention is shown in FIG. 3, in which a single actuator arm 100 from a drive system is attached to a top and bottom suspension arm, of which only top suspension arm 102 is visible. Top suspension arm 102 is attached to actuator arm 100 by base plate 108. Top suspension arm 102 holds a head or slider 104, while the bottom suspension arm holds a bottom head which is likewise not visible in this figure. Preamplifier chip 110 is connected by conductors 112 to head 104, with preamplifier chip 110 attached to a tab or flange 114 of suspension arm 102. Another set of conductors 116 connects the bottom head with preamplifier 120, which is mounted on a flange 122 of the bottom suspension arm. Conductors 112 and 116 are attached along a disk-facing side of top and bottom suspension arms, but cross over to attach to non-disk-facing sides of flanges 114 and 122, along with chips 110 and 120. Conductors 112 and 116 may alternatively be attached along non-disk-facing sides of top and bottom suspension arms, as shown in FIG. 1. Conductors 112 and 116 may be formed of flexible cables or traces, in accordance with disk drive trends toward trace suspension arms, cable interconnects, and flex circuits on suspension arms. Insulative material adjoining the conductors is typically translucent if not transparent and so is not shown for clarity. Another set of conductors 125 runs along a first side of arm 100 to provide electrical interconnection between preamp chip 110 and a mother amplifier disposed on a back end of the actuator, not shown, while conductors 127 are attached to a second side of arm 100 and provide electrical interconnection between preamp chip 120 and the mother amplifier. For the situation in which it is desirable for the sets conductors connecting the preamplifier chips and mother amplifier to be disposed on a single side of the arm, one of those conductor sets can cross over to the other side between the top and bottom suspension arms, and may be attached to the non-disk-facing side of its suspension arm.

Figure 4:
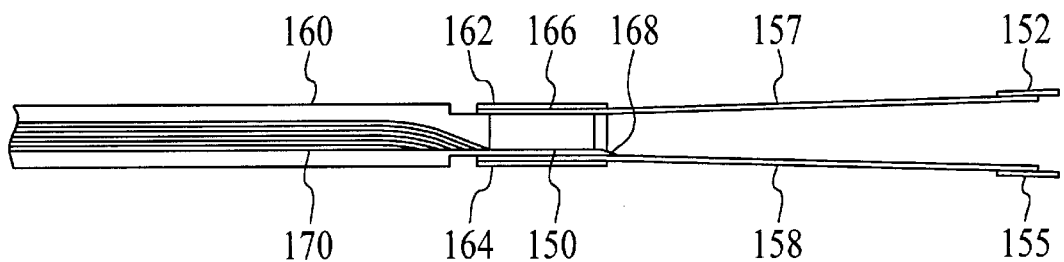
FIG. 4 is a side view of a third embodiment of the present invention in which a single preamplifier chip connected to a pair of heads is attached to a top suspension arm and disposed on a side of an actuator arm.

FIG. 4 shows an another embodiment of the present invention in which a single preamplifier chip 150 provides signal amplification for a pair of heads 152 and 155 that are connected by associated suspension arms 157 and 158 to an actuator arm 160. A top base plate 162 holds suspension arm 157 to actuator arm 160, while a bottom base plate 164 holds bottom suspension arm 158 to the arm 160. Although difficult to see in this side view, the chip 150 is glued or otherwise attached to a flange 166 that extends from a mounting end of suspension arm 157, similar to the flanges depicted for other embodiments. No such flange extends from suspension arm 158, allowing electrical interconnection to chip 150 after the suspension arms have been mounted to the actuator arm 160. Conductors connecting chip 150 and slider 152 are too small to see in this figure; however, conductors 168 interconnecting chip 150 and slider 155 can be seen where they leave the plane of suspension arm 158 to meet the chip. Conductors 170 interconnect preamplifier chip 150 with a mother amplifier, the mother amplifier also interconnected with other preamplifier chips disposed adjacent to other actuator arms, and not shown in this figure. Chip 150 is large enough to combine the functions of split preamplifier chips for the two heads, yet fits adjacent a side of arm 100 while allowing that arm to be as thin as needed for closer disk spacing.

Figure 5:
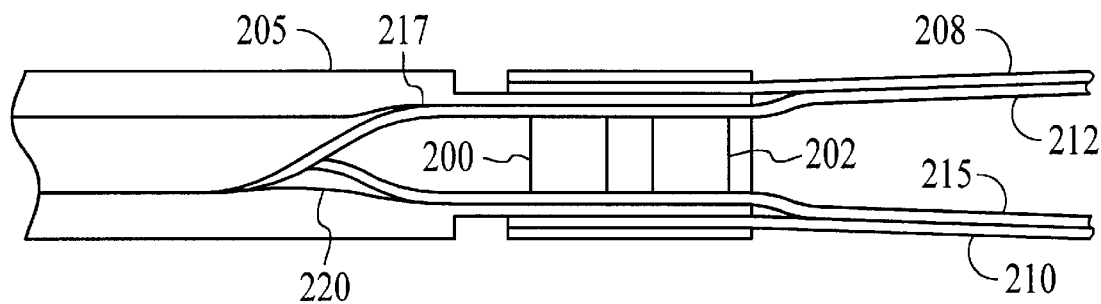
FIG. 5 is a cutaway side view of a fourth embodiment of the present invention in which a pair of preamplifier chips are mounted to a side of an actuator arm adjacent to a mounting end of a pair of suspension arms.

FIG. 5 shows an alternative embodiment in which a pair of preamplifier chips 200 and 202 or integrated circuits are mounted to a side of an actuator arm 205, interspaced between a pair of suspension arms 208 and 210. The location of such a chip or plurality of chips attached to an actuator arm can instead comprise the various examples listed above for attachment of such a chip to a suspension arm, such as having each of the chips attached to an opposite side of the actuator arm or having a single chip attached to a single actuator arm side. Attachment of the integrated circuit directly to the actuator arm has a number of advantages, including improvements in dynamic performance since the actuator arm is more rigid than the suspension arm, and better thermal conductivity and heat sink capacity for the chip through the large metal actuator arm. Additional advantages include the independence during manufacturing or repair of the amplifier and heads, allowing each to be tested and/or replaced more independently.

Electrical conductors such as flex circuits interconnect the preamplifier chips 200 and 202 with respective heads and an E-block mounted amplifier, both not shown in this figure. Thus conductors 212 are electrically connected to chip 200 and mounted to suspension arm 208 for connection to a head held at a far end of that suspension arm, while conductors 215 are electrically connected to chip 202 and mounted to suspension arm 210 for connection to a head held at a far end of that suspension arm. Another pair of conductive traces or the like connect the individual preamps with a mother amplifier, not shown, so that flex cables 217 are connected to preamp 200 and flex cables 220 are connected to preamp 202.

Figure 6:
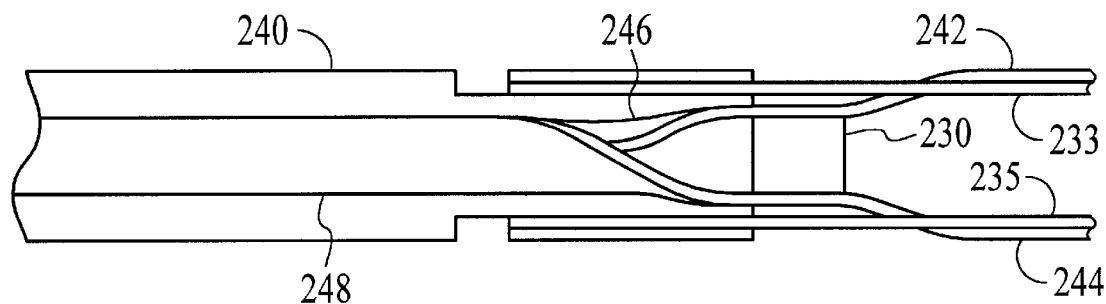
FIG. 6 is a cutaway side view of a fifth embodiment of the present invention in which an amplifier chip or chips are mounted to a tip of an actuator arm between a pair of suspension arms.
Figure 7:
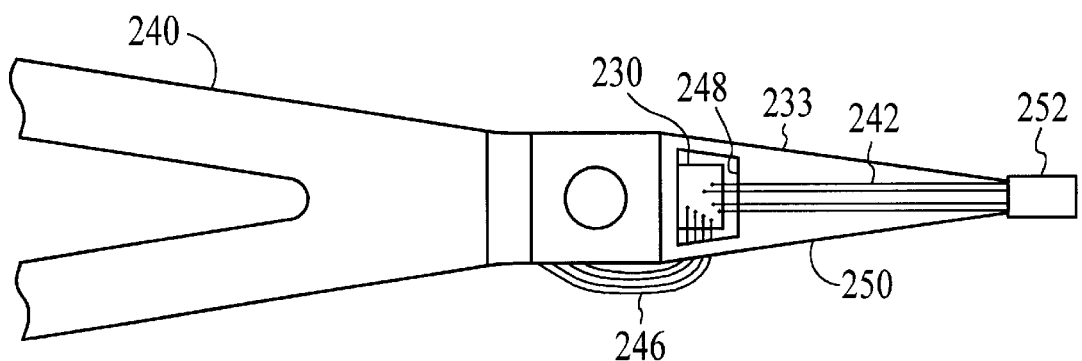
FIG. 7 is a top view of the actuator arm, suspension arms and chips of FIG. 6.

Alternatively, an amplifier chip 230 or chips can be attached between a pair of suspension arms 233 and 235 to a distal end of an actuator arm 240, as shown in FIG. 6. This extension of the chips toward the heads can accelerate data transfer rates by shortening lengths of flexible circuits 242 and 244 or conductive traces connecting the heads and amplifier or amplifiers, without interfering with dynamic performance of the slider load beam since the chips are connected instead to the rigid actuator arm. Another pair of flexible conductive cables 246 and 248 connect the chip 230 or chips to a mother amplifier or other drive electronics, not shown. The attachment of the amplifier chip 230 or chips to the distal end of the actuator arm 240 can position the chip adjacent to a void 248 in the load beam 233 that adjoins a spring or hinge 250, as shown in FIG. 7, so that electrical connections such as ball bonding between the chips and the conductive traces or flex circuits can occur through the voids. A pair of chips may be bonded to each other as well as to the actuator end. The conductors 242 can be disposed along a disk-facing or a non-disk-facing side of the beam to connect with slider 252, and need not pass through the void when disposed along the non-disk-facing side.

While a number of embodiments have been described above, variations and modifications of those embodiments are possible in accordance with the spirit and teachings of the present invention. Thus the scope of the invention is not to be limited by the foregoing examples but defined according to the following claims.

What is claimed is:

1. An assembly for a plurality of heads in a disk drive system, the assembly comprising:

a rigid actuator arm having a distal end moveable in a first direction and a thickness measured in a second direction normal to said first direction, first and second suspension arms each having a mounting end and a free end, with said mounting ends coupled to said actuator arm adjacent said distal end and separated by said thickness, first and second transducers, with said first transducer disposed adjacent said free end of said first suspension and said second transducer disposed adjacent said free end of said second suspension, and a first amplifier and a second amplifier, said first amplifier joined to said first suspension arm adjacent to said distal end and between said mounting ends, said second amplifier joined to said second suspension arm adjacent to said distal end and between said mounting ends, said first amplifier electrically connected to said first transducer and said second amplifier electrically connected to said second transducer, wherein a distance between said first amplifier and said first transducer is different from that between said second amplifier and said second transducer.

2. The assembly of claim 1, wherein said first amplifier is attached to said mounting end of said first suspension arm.

3. An assembly for a plurality of heads in a disk drive system, said assembly comprising:

an arm having first and second sides and a rigid section joined to a pair of relatively flexible sections at a juncture, said flexible sections each having a mounting end adjacent to said juncture and a free end distal to said juncture and configured for holding a transducer, with a separate amplifier electrically connected to each said transducer and attached to said arm adjacent the same said juncture, said amplifiers being disposed between said mounting ends and adjacent one of said sides.

4. The assembly of claim 3, wherein at least one of said amplifiers is attached to said mounting end of one of said flexible sections.

5. An extension for an actuator arm employed for positioning information storage or retrieval transducers, the extension comprising:

first and second suspensions each having a transducer end and a mounting end, with said mounting ends being connectable to the actuator arm, a first integrated circuit chip connected by a first plurality of electrical leads to a first transducer, said first integrated circuit chip attached to said first suspension adjacent to said first mounting end and separated from said first transducer end by a first distance, and a second integrated circuit chip connected by a second plurality of electrical leads to a second transducer, said second integrated circuit chip attached to said second suspension adjacent to said second mounting end and separated from said second transducer end by a second distance, wherein said first distance is different than said second distance.

6. The extension of claim 5, wherein said first and second suspensions are connected to said actuator arm and said first and second integrated circuit chips are disposed between said suspensions.

7. The extension of claim 6, further comprising a first head connected to said first transducer end and a second head connected to said second transducer end, with neither said first head nor said second head disposed between said suspensions.

8. The extension of claim 5, wherein said first transducer is connected to said first transducer end, and said second transducer is connected to said second transducer end, with said first transducer disposed on an opposite side of said first suspension from said first integrated circuit chip and said second transducer disposed on an opposite side of said second suspension from said second integrated circuit chip.

9. The extension of claim 5, wherein said first plurality of electrical leads are attached to a non-disk-facing side of said first suspension.

10. A head stack assembly comprising:

a body having a rigid arm pointing in a first direction, said arm having a thickness measured in a second direction substantially perpendicular to said first direction, first and second suspensions each having a mounting end and a free end, said mounting ends being attached to said arm and separated by said thickness, a first transducer held adjacent said free end of said first suspension, a second transducer held adjacent said free end of said second suspension, a first amplifier attached to said mounting end of said first suspension and connected to said first transducer with a first plurality of electrical leads, and a second amplifier attached to said mounting end of said second suspension and connected to said second transducer with a second plurality of electrical leads, wherein said first and said second amplifiers each are disposed adjacent the same side of said rigid arm and have a dimension extending in said second direction that is greater than half of said thickness.

11. The assembly of claim 10, wherein said arm has a first side and a second side, said first and second side being separated along a third direction that is substantially perpendicular to said first and second directions, and said first and second amplifiers are disposed adjacent said first side.

* * * * *